United States Patent
Slackman

(10) Patent No.: US 7,206,780 B2
(45) Date of Patent: Apr. 17, 2007

(54) RELEVANCE VALUE FOR EACH CATEGORY OF A PARTICULAR SEARCH RESULT IN THE RANKED LIST IS ESTIMATED BASED ON ITS RANK AND ACTUAL RELEVANCE VALUES

(75) Inventor: Richard O. Slackman, Shiloh, IL (US)

(73) Assignee: SBC Knowledge Ventures, L.P., Reno, NV (US)

( * ) Notice: Subject to any disclaimer, the term of this patent is extended or adjusted under 35 U.S.C. 154(b) by 515 days.

(21) Appl. No.: 10/607,811

(22) Filed: Jun. 27, 2003

(65) Prior Publication Data

US 2004/0267717 A1    Dec. 30, 2004

(51) Int. Cl.
G06F 17/30 (2006.01)
G06F 17/00 (2006.01)

(52) U.S. Cl. ............... 707/7; 707/5; 707/104.1
(58) Field of Classification Search ........... 707/1–7, 707/10, 100–104.1, 200; 709/215–220, 222–223; 705/10, 26–27, 1; 715/512–513; 706/45–50
See application file for complete search history.

(56) References Cited

U.S. PATENT DOCUMENTS

| | | | |
|---|---|---|---|
| 5,870,740 A * | 2/1999 | Rose et al. | 707/5 |
| 5,875,446 A * | 2/1999 | Brown et al. | 707/3 |
| 5,905,862 A * | 5/1999 | Hoekstra | 709/202 |
| 5,924,090 A * | 7/1999 | Krellenstein | 707/5 |
| 6,167,398 A * | 12/2000 | Wyard et al. | 707/5 |
| 6,728,704 B2 * | 4/2004 | Mao et al. | 707/3 |
| 7,099,859 B2 * | 8/2006 | Sundaresan | 707/3 |
| 2002/0049756 A1 * | 4/2002 | Chua et al. | 707/4 |
| 2002/0078045 A1 * | 6/2002 | Dutta | 707/7 |
| 2002/0111847 A1 * | 8/2002 | Smith, II | 705/10 |
| 2002/0165873 A1 * | 11/2002 | Kwok et al. | 707/500 |
| 2002/0169764 A1 * | 11/2002 | Kincaid et al. | 707/3 |
| 2003/0018621 A1 * | 1/2003 | Steiner et al. | 707/3 |
| 2003/0037074 A1 * | 2/2003 | Dwork et al. | 707/500 |
| 2003/0041054 A1 | 2/2003 | Mao et al. | |
| 2003/0101286 A1 * | 5/2003 | Kolluri et al. | 709/316 |
| 2003/0120654 A1 * | 6/2003 | Edlund et al. | 707/7 |
| 2003/0130994 A1 * | 7/2003 | Singh et al. | 707/3 |

(Continued)

FOREIGN PATENT DOCUMENTS

EP    1072984 A2 *    1/2001    ............... 17/30

(Continued)

OTHER PUBLICATIONS

Javed A Aslam et al. "Models for metasearch", Annual ACM conference on Research and development in information retrival proceedings of the 24th annual international conference, 2001, pp. 276-284.*

(Continued)

*Primary Examiner*—Srirama Channavajjala
(74) *Attorney, Agent, or Firm*—Toler Schaffer, LLP

(57) ABSTRACT

A ranked list of search results is received from a search engine based on a search query. A relevance value of a particular search result in the ranked list is estimated based on its rank and actual relevance values and ranks of at least two others of the search results.

18 Claims, 4 Drawing Sheets

U.S. PATENT DOCUMENTS

| | | | | |
|---|---|---|---|---|
| 2003/0217056 | A1* | 11/2003 | Allen et al. ................... | 707/7 |
| 2003/0220912 | A1* | 11/2003 | Fain et al. ..................... | 707/3 |
| 2004/0267717 | A1* | 12/2004 | Slackman ...................... | 707/3 |

FOREIGN PATENT DOCUMENTS

| | | | | |
|---|---|---|---|---|
| EP | 1158423 A2 | * | 11/2001 | ................ 17/30 |
| WO | WO 00/77689 A1 | * | 12/2000 | ................ 17/30 |
| WO | WO 2004/097671 | * | 11/2004 | ................ 17/30 |
| WO | WO 2005/057359 | * | 6/2005 | |
| WO | WO 2005091825 | * | 10/2005 | |

OTHER PUBLICATIONS

Nick Craswell et al. "Server selection on the world wide web", 2000, ACM pp. 37-46.*

Eugene Agichtein et al. "Learning search engine specific query transformations for question answering", ACM, WWW 10, May 1-5, 2001, 10 pages.*

Nick Craswell et al. "relevance weighting for query independent evidence", SIGIR 05, Aug. 2005, proceedings of the 28th annual international ACM SIGIR conference on research and development in informatin retrieval, pp. 416-423.*

Kolak,O et al. "on ranking and organizing web query results", proceedings workshop on knowledge and data engineering exchange, 1999, pp. 26-33.*

Kmin Wu et al. "category-based search using metadatabase in imae retrieval", Proceedings, 2002 IEEE international conference on multimedia and expo, 2002, vol. 1, pp. 197-200.*

* cited by examiner

RELEVANCE VALUE FOR EACH CATEGORY OF A PARTICULAR SEARCH RESULT IN THE RANKED LIST IS ESTIMATED BASED ON ITS RANK AND ACTUAL RELEVANCE VALUES

FIELD OF THE DISCLOSURE

The present disclosure relates to search engines.

DESCRIPTION OF THE RELATED ART

U.S. Patent Application Publication No. 2003/0041054 now to U.S. Pat. No. 6,728,704 Mao et al. discloses a method of merging results lists from multiple search engines. In particular, each of the search engines returns a respective results list based on a search query. A subset of entries in each results list is selected. Each entry in the subset is assigned a scoring value representing how closely the entry matches the search query. Each results list is assigned a representative value based on the scoring values assigned to its subset of entries. A merged list is formed based on each representative value and each scoring value.

BRIEF DESCRIPTION OF THE DRAWINGS

The present invention is pointed out with particularity in the appended claims. However, certain features are described in the following detailed description in conjunction with the accompanying drawing in which:

DETAILED DESCRIPTION OF THE DRAWINGS

Embodiments of the present invention address situations in which some search results have a search-engine-supplied relevance value indicating how closely the result matches a search query, but other search results are absent a search-engine-supplied relevance value. An estimated relevance value is determined for those search results absent the search-engine-supplied relevance value. The estimated relevance value for a search result is based on its rank in a ranked list of the search results, and known relevance values and ranks of at least two others of the search results.

Further, embodiments of the present invention address meta-search situations in which all search engines queried are not assumed to provide equally relevant results. A search engine weighting factor is determined to weight search results based on their originating search engine.

Figure 1:
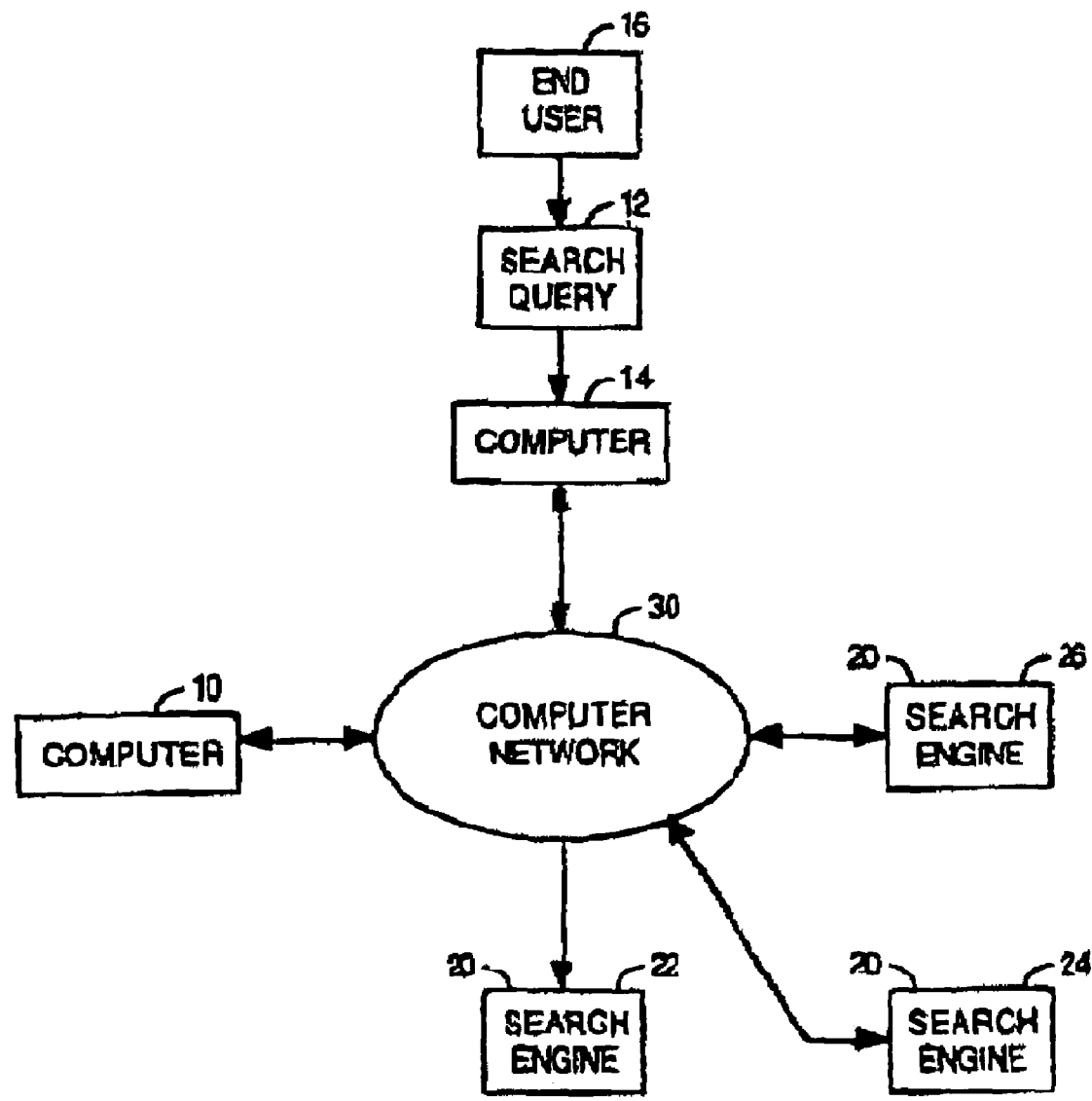
FIG. 1 is a block diagram of a system for merging search results lists.

FIG. 1 is a block diagram of a system for merging search results lists. The system comprises a computer 10 that receives a search query 12 from a computer 14 of an end user 16. The computer 10 communicates with multiple search engines 20 to perform multiple searches based on the search query 12. For purposes of illustration and example, three search engines 22, 24 and 26 are depicted. Those having ordinary skill will appreciate that an arbitrary number of search engines may be used.

Communication between the computers 10 and 14, and between the computer 10 and the search engines 20, may be facilitated by a computer network 30. Examples of the computer network 30 include, but are not limited to, the Internet, an intranet, an extranet, a local area network (LAN) and a wide-area network (WAN).

Figure 2:
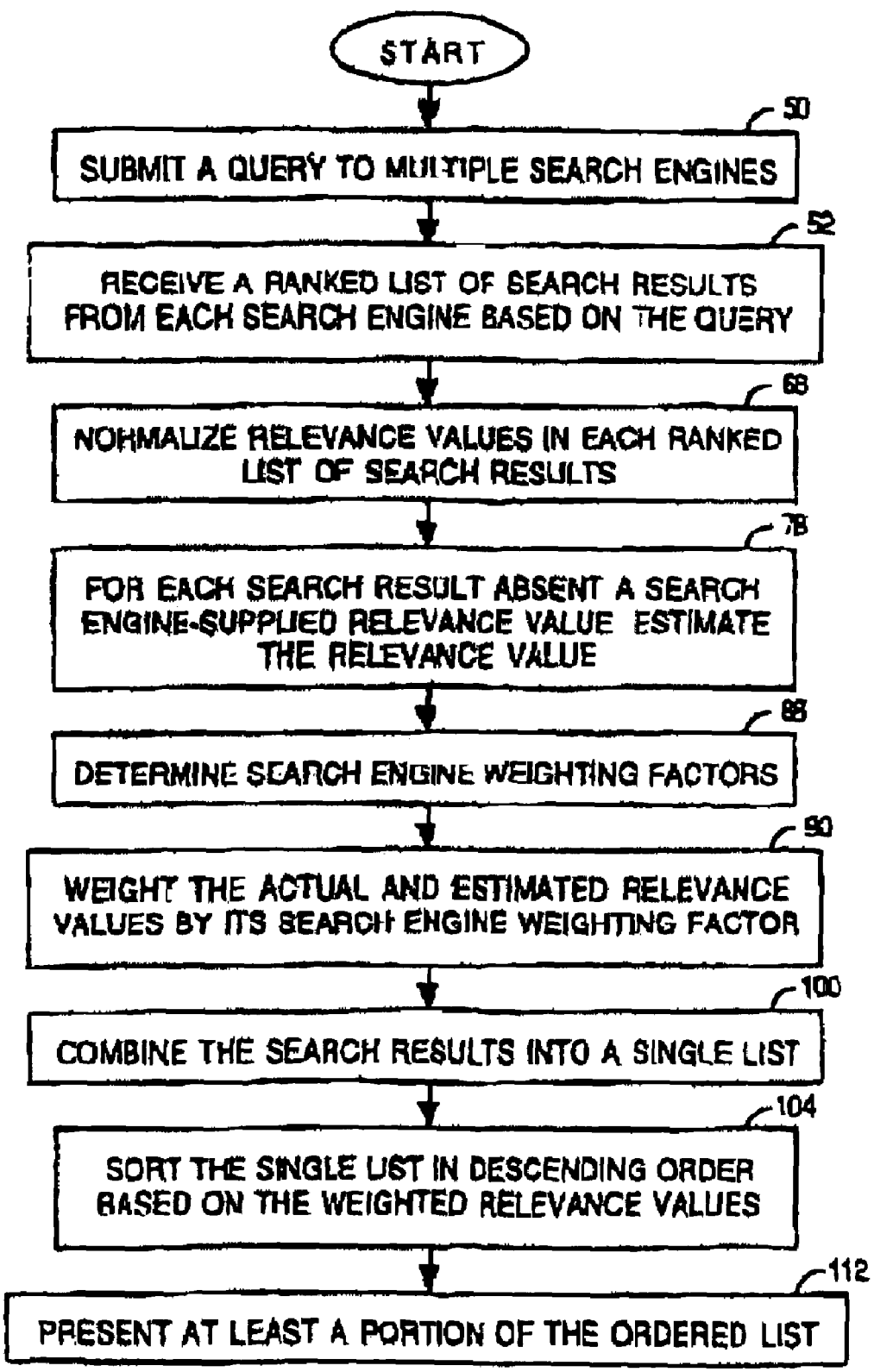
FIG. 2 is a flow chart of an embodiment of a method performed by a computer upon receiving a search query.

An embodiment of a method performed by the computer 10 upon receiving the search query 12 is described with reference to FIG. 2. The method can be directed by computer program code stored by a computer-readable medium which causes the computer 10 to perform the acts described herein. Examples of the computer-readable medium include, but are not limited to, a magnetic medium such as a hard disk, an optical medium such as an optical disk, and an electronic medium such as an electronic memory.

Figure 3:
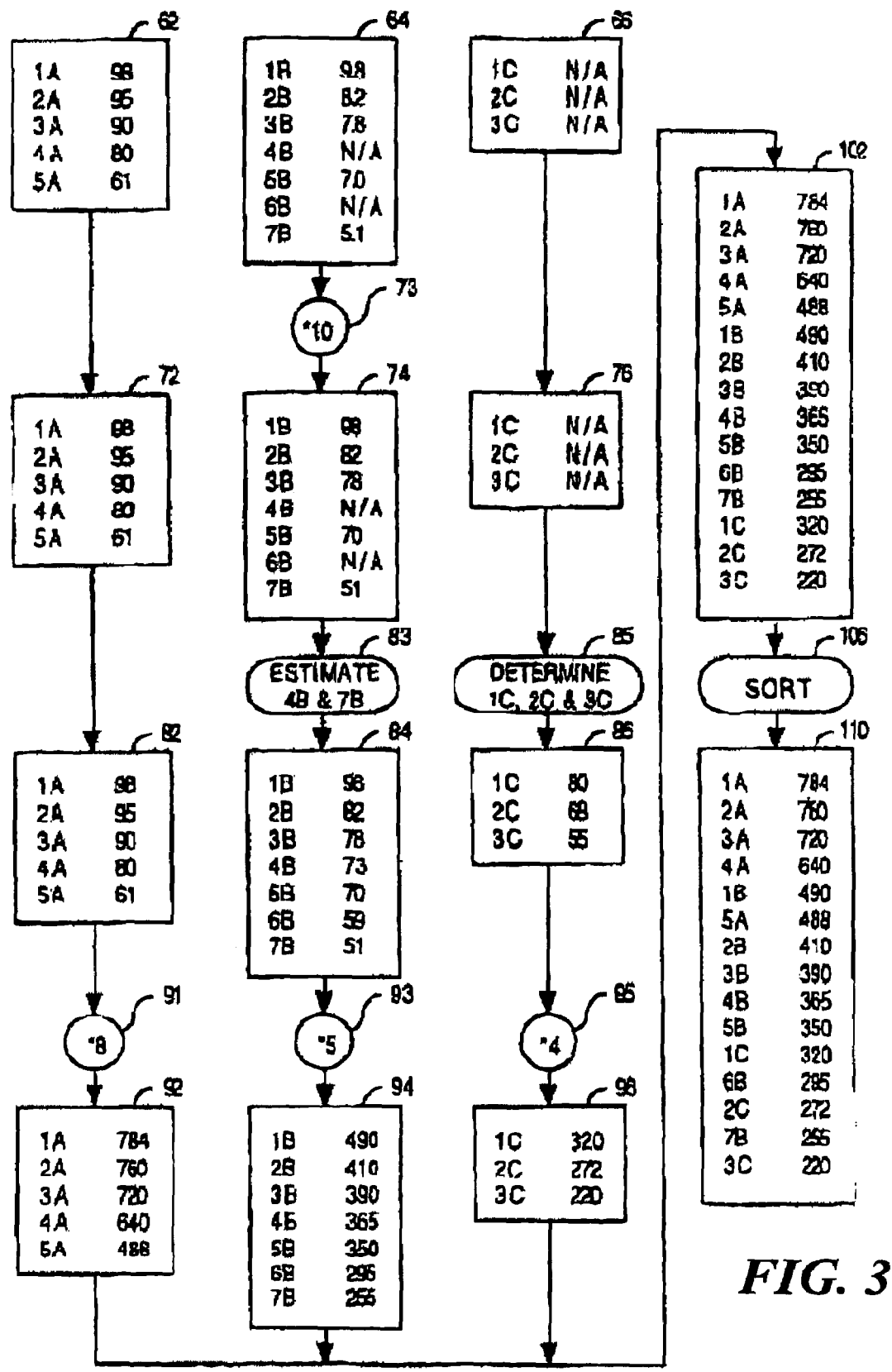
FIG. 3 is a block diagram to illustrate an example of acts described with reference to FIG. 2.

Reference will be made to FIG. 3 to illustrate an example of the acts described with reference to FIG. 2. Those having ordinary skill should appreciate that the scope of this disclosure is not limited by the example provided in FIG. 3.

As indicated by block 50, the method comprises submitting the search query 12 to the search engines 20. Each of the search engines 20 performs a search based on the search query 12, and generates a ranked list of search results. Some, and possibly all, of the search results in each list have an associated relevance value determined by its originating one of the search engines 20.

As indicated by block 52, the method comprises receiving a ranked list of search results from each search engine based on the search query 12. For each list, each search result therein is ranked based on its relevance value to the search query 12. The ranks of the search results in a list may be indicated by listing the search results in descending order of relevance, for example. In another example, the ranks of the search results in a list may be explicitly indicated by a rank value, in which case the ordering of the search results in the list may or may not be relevance-based.

The act of block 52 may further comprise receiving, from each of the search engines 20, a plurality of actual relevance values for one or more of the search results in its associated list. Each search-engine-supplied, actual relevance value indicates a degree of relevance between the search query 12 and its associated search result. Each of the search engines 20 may have its own scale for relevance values, and/or its own methodology for determining the relevance values. For example, some of the search engines 20 may have a scale from 0 to 100, others may have a scale from 0 to 10, and still others may have a scale from 0 to 1.

To illustrate an example of the ranked lists, consider the search query 12 comprising "capital gain". FIG. 3 shows three ranked lists 62, 64 and 66 of search results received by the computer 10 from the search engines 22, 24 and 26, respectively, based on the search query 12. The ranked list 62 includes five search results, each of which having an associated relevance value on a scale from 0 to 100 supplied by the search engine 22. The ranked list 64 includes seven search results, five of which having an associated relevance value on a scale from 0 to 10 supplied by the search engine 24, and two of which having no associated relevance value. The ranked list 66 includes three search results, none of which having an associated relevance value supplied by the search engine 26.

Referring back to FIG. 2, an act of normalizing the relevance values in the ranked lists of search results is performed, as indicated by block 68. Based on a known scale for each search engine's relevance values, the relevance values are normalized so that each list has the same scale. For example, the relevance values may be normalized so that all have a scale from 0 to 100.

Continuing with the example of FIG. 3, consider that the relevance values are to be normalized to have a 0-to-100 scale. Since the relevance values in the ranked list 62 are already scaled between 0 and 100, normalized values in block 72 are unchanged from those in the ranked list 62. The relevance values in the ranked list 64, being scaled between 0 and 10, are multiplied by 10 in block 73 to produce normalized values in block 74. Since the ranked list 66 has no relevance values, there is no need to normalize any values to arrive at a list 76.

Referring back to FIG. 2, the method comprises estimating a relevance value for at least one of the search results absent an actual relevance value, as indicated by block 78. In some embodiments, a relevance value is estimated for each of the search results absent an actual relevance value. The relevance value is estimated based on the rank of its search result in the list, and the ranks and actual relevance values of at least two others of the search results. The relevance value may be estimated using either curve fitting, interpolation or extrapolation.

In some embodiments a curve representing relevance as a function of rank is lit to each list having an unknown relevance value. The curve is fit to some or all of the known, actual relevance values in the list. A relevance value for a search result is estimated by evaluating the fitted curve at the known rank of the search result. If the curve is a line, linear regression can be used to generate a linear relevance vs. rank function. Non-linear relevance vs. rank curves are also contemplated.

In other embodiments, an interpolation function representing relevance as a function of rank is determined for each list having an unknown relevance value. The interpolation function is based on some or all of the known, actual relevance values in the list. A relevance value for a search result is estimated by evaluating the interpolation function at the known rank of the search result. In one embodiment, an unknown relevance value of a search result is estimated by linearly interpolating between two known relevance values whose ranks bracket (i.e. one rank is greater than, another rank is less than) the rank of the search result. Non-linear interpolation functions are also contemplated.

Continuing with the example of FIG. 3, since all of the relevance values in the normalized, ranked list 72 are actual, known values, there is no need to estimate any relevance values to arrive at the values in list 82. Two relevance values, 4B and 7B, from the normalized, ranked list 74 are to be estimated 83. In this example, linear least squares regression is used to fit a line to the (rank, relevance) values of (1, 98), (2, 82), (3, 78), (5, 70) and (7, 51). A linear function of relevance=−7*rank+100.8 results from the linear regression. The estimated relevance value of search result 4B, after rounding, is −7*4+100.8=73. The estimated relevance value of search result 7B, after rounding, is −7*7+100.8=51. A resulting list including both known and estimated relevance values is shown in block 84.

All relevance values, 1C, 2C and 3C, from the normalized, ranked list 76 are to be determined 85. The computer 10, using its own measure of relevance which may or may not differ from a measure of relevance employed by the search engine 26, determines actual relevance values for at least two of the search results in the list 76. The number of search results for which the computer 10 determines actual relevance values can be based on a desired accuracy. The remaining search results in the list are estimated using curve fitting, interpolation or extrapolation for the actual relevance values determined by the computer 10. In one embodiment, the computer 10 determines actual relevance values for the most relevant search result (e.g. 1C) and least relevant search result (e.g. 3C) in the list 76. The remaining search results in the list are estimated by linearly interpolating between the most relevant and least relevant search results. For purposes of illustration and example, consider the computer 10 to determine an actual relevance value of 80 for the search result 1C, and an actual relevance value of 55 for the search result 3C. A linear function of relevance=−2.5*rank+ 92.5 results from the linear interpolation. The estimated relevance value of search result 2C, after rounding, is −12.5*2+92.5=68. A resulting list including both actual and estimated relevance values is shown in block 86.

It is noted that as an option, the computer 10 can determine actual relevance values for all unknown relevance values in a list. However, since the measure of relevance employed by the computer 10 may differ from the measure of relevance employed by the search engine 26, this approach may result in a contradiction between the ranks and the relevance values (i.e. in comparison to one search result, another better-ranked search result may have a lower relevance value). The use of linear interpolation based on the most relevant and least relevant search results in the list mitigates the likelihood of the contradiction.

Returning to FIG. 2, the method comprises determining an associated weighting value for each of the search engines 20 as indicated by block 88. The weighting value indicates how relevant the search engine or its results are to search query 12. For example, a search engine for a specialized information base that pertains to the search query 12 may be given a greater weighting value than a search engine for a general information base. An embodiment of a method of determining a search engine weighting value is subsequently described with reference to FIG. 4. For purposes of illustration and example, consider the search engine 22 having a weighting value of 8 for the search query 12, the search engine 24 having a weighting value of 5 for the search query 12, and the search engine 26 having a weighting value of 4 for the search query 12.

As indicated by block 90, the method comprises determining, for each of the ranked lists, an associated weighted relevance value for each of its search results based on an actual or estimated relevance value of the search result and the weighting value associated with the search engine that provided the ranked list. In one embodiment, the weighted relevance value is a product of the aforementioned actual or estimated relevance value and the aforementioned weighting value.

Continuing with the example of FIG. 3, the relevance values in the list 82 are multiplied (see block 91) by the weighting value of 8 associated with the search engine 22 to produce a list 92 of weighted relevance values. The relevance values in the list 84 are multiplied (see block 93) by the weighting value of 5 associated with the search engine 24 to produce a list 94 of weighted relevance values. The relevance values in the list 86 are multiplied (see block 95) by the weighting value of 4 associated with the search engine 26 to produce a list 96 of weighted relevance values.

Returning to FIG. 2, the method comprises combining the search results into a single list, as indicated by block 100. Continuing with the example of FIG. 3, the lists 92, 94 and 96 are combined to form a single list 102.

As indicated by block 104, the method comprises sorting the single list in descending order based on the weighted relevance values. Continuing with the example of FIG. 3, the single list 102 is sorted 106 based on the weighted relevance values to form an ordered list 110.

As indicated by block 112, the method comprises presenting at least a portion of the ordered list 110. This act may comprise the computer 10 outputting a signal to be communicated to the computer 14 via the computer network 30. The signal may encode a search results page or pages, such as a Web page or pages or another type of electronic document, that presents the ordered list 110. The signal may include code in a markup language such as Hypertext Markup Language (HTML), Handheld Markup Language (HDML) or Wireless Markup Language (WML) to present the ordered list 110. The computer 14 receives the signal and displays some or all of the ordered list 110 for view by the end user 16. Each of the search results in the ordered list 110 may be presented with a hyperlink to its corresponding electronic document (e.g. a Web page, an image, a word processing document, or a portable document file). The hyperlink can be selected by the end user 16 to access the corresponding electronic document.

Figure 4:
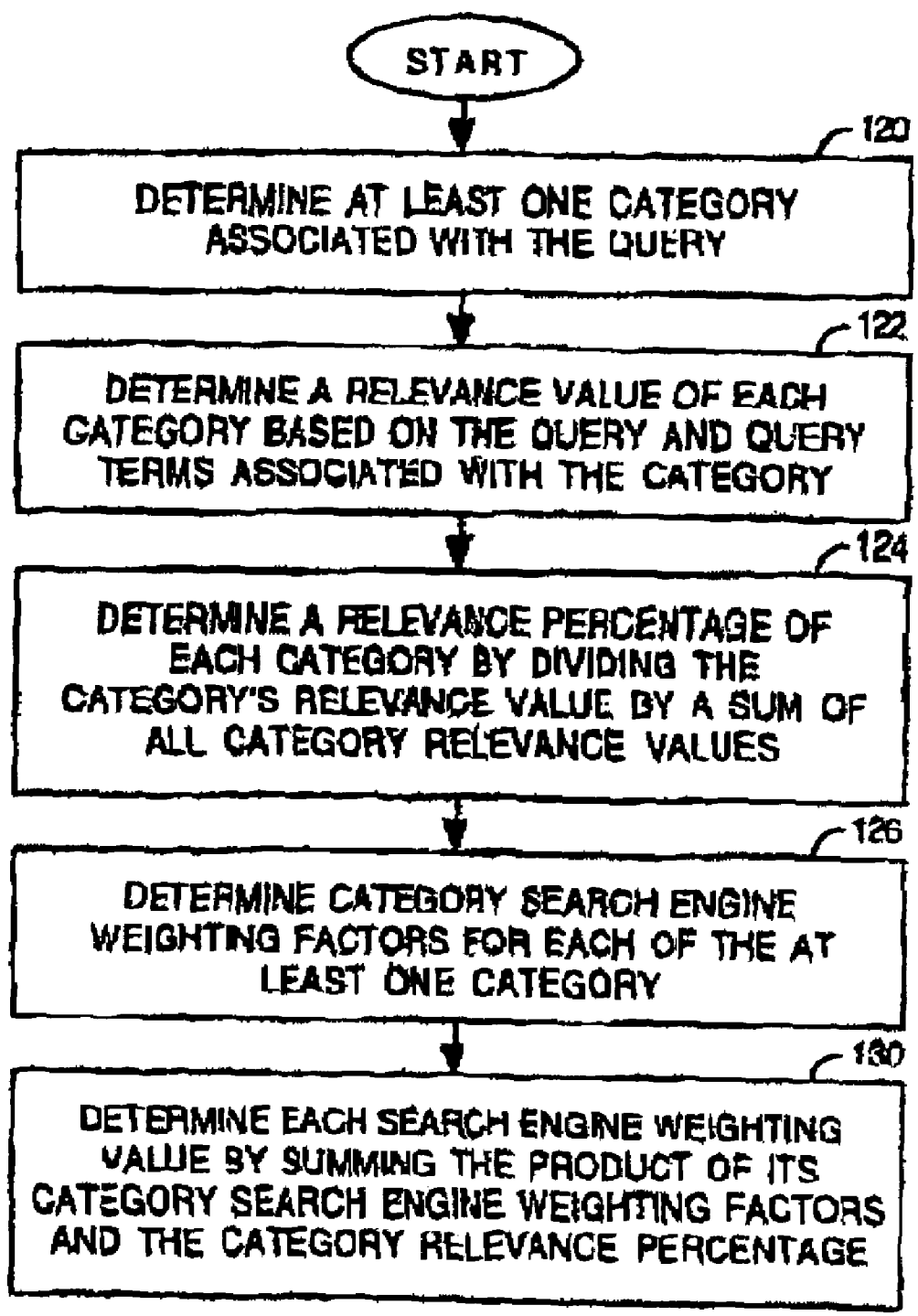
FIG. 4 is a flow chart of an embodiment of a method of determining a search engine weighting value.

FIG. 4 is a flow chart of an embodiment of a method of determining a search engine weighting value. As indicated by block 120, the method comprises determining one or more categories associated with the search query 12. Continuing with the example of the search query 12 comprising "capital gain", consider two categories associated with the word "capital". A first category has the following category query terms: capital, payment and financial. A second category has the following category query terms: capital, Washington, capitol and government.

As indicated by block 122, the method comprises determining an absolute relevance value of each category based on the search query 12 and query terms associated with the category. Continuing with the above example, the search query 12 of "capital gain" is compared to the category query terms of "capital", "payment" and "financial" to yield an absolute relevance value of 66 for the first category. The search query 12 of "capital gain" is compared to the category query terms of "capital", "Washington", "capitol" and "government" to yield an absolute relevance value of 25 for the second category.

As indicated by block 124, the method comprises determining a relative relevance value for each category by dividing its absolute relevance value by a sum of all absolute relevance values. Continuing with the above example, the relative relevance value for the first category, after rounding in percentage terms, is 66/(66+25)=73%. The relative relevance value for the second category, after rounding in percentage terms, is 25/(66+25)=27%.

As indicated by block 126, the method comprises determining category search engine weighting factors for each of the one or more categories. The category search engine weighting factor indicates how well the search engine is expected to find results in the particular category. Continuing with the example, consider the search engine 22 Consider the search engine 24 having a factor of 5 for the first category and a factor of 5 for the second category. Consider the search engine 26 having a factor of 2 for the first category and a factor of 9 for the second category. Based on the aforementioned factors, one can view the search engine 22 as being more financially-oriented, the search engine 26 as being more government-oriented, and the search engine 24 as being more generalized.

As indicated by block 130, the method comprises determining the search engine weighting value based on a sum, over the categories, of each product of its associated category search engine weighting value and its relative relevance value. Continuing with the example, the search engine weighting value for the search engine 22, after rounding, is 10*0.73+3*0.27=8. The search engine weighting value for the search engine 24, after rounding, is 5*0.73+5*0.27=5. The search engine weighting value for the search engine 26, after rounding, is 2*0.73+9*0.27=4.

It will be apparent to those skilled in the art that the disclosed embodiments may be modified in numerous ways and may assume many embodiments other than the particular forms specifically set out and described herein. For example, the acts depicted in FIGS. 2 and 4 are not limited to the order depicted therein, and may be performed either in an alternative order or in parallel.

Accordingly, the above disclosed subject matter is to be considered illustrative, and not restrictive, and the appended claims are intended to cover all such modifications, enhancements, and other embodiments which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method of weighting search results, the method comprising:

submitting a search query to a plurality of search engines;

receiving, from each of the plurality of search engines, an associated ranked list of search results based on the search query;

receiving a plurality of actual relevance values for a plurality of the search results based on the search query;

for at least one of the search results absent the actual relevance value, estimating its relevance value based on its rank, and the ranks and the actual relevance values of at least two others of the search results;

determining, for each of the plurality of search engines, an associated weighting value;

determining, for each of the ranked lists, an associated weighted relevance value for each of its search results based on the estimated relevance value or the actual relevance value of the search result and the weighting value associated with the search engine that provided the ranked list;

combining the ranked lists into a single list; and sorting the search results in the single list based on the associated weighted relevance values;

wherein said determining the associated weighting value for a search engine comprises:

determining a plurality of categories associated with the search query;

determining an associated category search engine weighting value for each of the categories;

determining a first associated relevance value for each of the categories based on the search guery and one or more guery terms associated with the category;

determining a second associated relevance value for each of the categories by dividing its first associated relevance value by a sum of all first associated relevance values; and determining the associated weighting value based on a sum, over the categories, of each product of the associated category search engine weighting value and the second associated relevance value, outputting the search results.

2. The method of claim 1 wherein the actual values comprise normalized search-engine-supplied relevance values.

3. The method of claim 1 wherein said estimating comprises:
   fitting a curve, to represent relevance as a function of rank, to the actual relevance values and the ranks of the at least two others of the search results; and
   evaluating the curve at the rank of the particular search result to estimate the relevance value.

4. The method of claim 1 wherein said estimating comprises:
   determining an interpolation function, to represent relevance as a function of rank, for the actual relevance values and the ranks of the at least two others of the search results; and
   evaluating the interpolation function at the rank of the particular search result to estimate the relevance value.

5. The method of claim 1 wherein the actual relevance values are search-engine-supplied.

6. The method of claim 1 wherein the actual relevance values are not search-engine-supplied.

7. An apparatus to weight search results, the apparatus comprising:
   a computer programmed to perform acts of:
   submitting a search query to a plurality of search engines;
   receiving, from each of the plurality of search engines, an associated ranked list of search results based on the search query;
   receiving a plurality of actual relevance values for a plurality of the search results based on the search query;
   for at least one of the search results absent an actual relevance value, estimating its relevance value based on its rank, and the ranks and the actual relevance values of at least two others of the search results;
   determining, for each of the plurality of search engines, an associated weighting value;
   determining, for each of the ranked lists, an associated weighted relevance value for each of its search results based on the estimated relevance value or the actual relevance value of the search result and the weighting value associated with the search engine that provided the ranked list;
   combining the ranked lists into a single list; and
   sorting the search results in the single list based on the associated weighted relevance values;
   wherein said determining the associated weighting value for a search engine comprises:
      determining a plurality of categories associated with the search query;
      determining an associated category search engine weighting value for each of the categories;
      determining a first associated relevance value for each of the categories based on the search query and one or more query terms associated with the category;
      determining a second associated relevance value for each of the categories by dividing its first associated relevance value by a sum of all first associated relevance values; and
      determining the associated weighting value based on a sum, over the categories, of each product of the associated category search engine weighting value and the second associated relevance value, outputting the search results.

8. The apparatus of claim 7, wherein the actual values comprise normalized, search-engine-supplied relevance values.

9. The apparatus of claim 7 wherein said estimating comprises:
   fitting a curve, to represent relevance as a function of rank, to the actual relevance values and the ranks of the at least two others of the search results; and
   evaluating the curve at the rank of the particular search result to estimate the relevance value.

10. The apparatus of claim 7 wherein said estimating comprises:
    determining an interpolation function, to represent relevance as a function of rank, for the actual relevance values and the ranks of the at least two others of the search results; and
    evaluating the interpolation function at the rank of the particular search result to estimate the relevance value.

11. The apparatus of claim 7 wherein the actual relevance values are search-engine-supplied.

12. The apparatus of claim 7 wherein the actual relevance values are not search-engine-supplied.

13. An article to weight search results, the article comprising:
    a computer-readable storage medium having computer-readable program code to cause a computer to perform acts of:
    submitting a search query to a plurality of search engines;
    receiving; from each of the search engines, an associated ranked list of search results based on the search query;
    receiving a plurality of actual relevance values for a plurality of the search results based on the search query;
    for at least one of the plurality of search results absent an actual relevance value, estimating its relevance value based on its rank, and the ranks and the actual relevance values of at least two others of the search results;
    determining, for each of the plurality of search engines, an associated weighting value;
    determining, for each of the ranked lists, an associated weighted relevance value for each of its search results based on the estimated relevance value or the actual relevance value of the search result and the weighting value associated with the search engine that provided the ranked list;
    combining the ranked lists into a single list; and
    sorting the search results in the single list based on the associated weighted relevance values;
    wherein said determining the associated weighting value for a search engine comprises:
       determining a plurality of categories associated with the search guery;
       determining an associated category search engine weighting value for each of the categories;
       determining a first associated relevance value for each of the categories based on the search guery and one or more guery terms associated with the category;
       determining a second associated relevance value for each of the categories by dividing its first associated relevance value by a sum of all first associated relevance values; and
       determining the associated weighting value based on a sum, over the categories, of each product of the associated category search engine weighting value and the second associated relevance value, outputting the search results.

14. The article of claim 13 wherein the actual relevance values comprise normalized, search-engine-supplied relevance values.

15. The article of claim 13 wherein said estimating comprises:

fitting a curve, to represent relevance as a function of rank, to the actual relevance values and the ranks of the at least two others of the search results; and evaluating the curve at the rank of the particular search result to estimate the relevance value.

16. The article of claim 13 wherein said estimating comprises:

determining an interpolation function, to represent relevance as a function of rank, for the actual relevance values and the ranks of the at least two others of the search results; and evaluating the interpolation function at the rank of the particular search result to estimate the relevance value.

17. The article of claim 13 wherein the actual relevance values are search-engine-supplied.

18. The article of claim 13 wherein the actual relevance values are not search-engine-supplied.

* * * * *